US011608005B2

(12) United States Patent
Salter et al.

(10) Patent No.: US 11,608,005 B2
(45) Date of Patent: Mar. 21, 2023

(54) VEHICLE DOOR POCKET (71) Applicant: Ford Global Technologies, LLC, Dearborn, MI (US)

(72) Inventors: Stuart C. Salter, White Lake, MI (US); Amy Lynn Marentic, Plymouth, MI (US); David Brian Glickman, Southfield, MI (US); Paul Kenneth Dellock, Northville, MI (US); Annette Lynn Huebner, Highland, MI (US); Robert J. Gelardi, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 309 days.

(21) Appl. No.: 17/022,501

(22) Filed: Sep. 16, 2020

(65) Prior Publication Data
US 2022/0080895 A1    Mar. 17, 2022

(51) Int. Cl.
*B60R 7/04*         (2006.01)
*B60R 16/033*       (2006.01)
*B60R 7/00*         (2006.01)
*B60J 5/04*         (2006.01)
*B60R 13/02*        (2006.01)

(52) U.S. Cl.
CPC .......... *B60R 7/046* (2013.01); *B60R 16/033* (2013.01); *B60J 5/0413* (2013.01); *B60R 7/005* (2013.01); *B60R 13/02* (2013.01); *B60R 13/0243* (2013.01)

(58) Field of Classification Search
CPC ......... B60R 7/046; B60R 7/005; B60R 13/02; B60R 13/0243; B60R 16/03; B60R 16/033; B60R 11/02; B60J 5/0412; B60J 5/0413
See application file for complete search history.

(56) References Cited

U.S. PATENT DOCUMENTS

| 5,009,458 A | * | 4/1991 | Shute | ............... B60R 7/005 224/543 |
| 6,120,077 A | * | 9/2000 | Westphal | .......... B60R 7/005 296/37.13 |

(Continued)

FOREIGN PATENT DOCUMENTS

| CN | 205100741 U | 3/2016 |
| CN | 207523597 U | 6/2018 |

(Continued)

*Primary Examiner* — Justin M Larson
(74) *Attorney, Agent, or Firm* — Vichit Chea; Carlson, Gaskey & Olds, P.C.

(57) ABSTRACT

An apparatus, according to an exemplary aspect of the present disclosure includes, among other things, a vehicle door panel, a removeable structure having a retention member fixed on the vehicle door panel, and a holding element associated with the retention member to provide a pocket that can be configured in different ways to accommodate a plurality of powered devices. A power interface in the vehicle door panel powers at least one of the plurality of powered devices. A method according to an exemplary aspect of the present disclosure includes, among other things, providing the power interface in the vehicle door panel to power at least one of the plurality of powered devices, and providing a communications link between at least one of the plurality of powered devices and a vehicle touchscreen or control.

25 Claims, 9 Drawing Sheets

(56) References Cited

U.S. PATENT DOCUMENTS

| | | | | |
|---|---|---|---|---|
| 6,682,115 | B1* | 1/2004 | Tiesler | B60R 7/005 224/483 |
| 6,971,698 | B1* | 12/2005 | King | B60R 7/046 296/146.7 |
| 8,061,550 | B2* | 11/2011 | Browne | B60R 7/005 220/666 |
| 9,656,614 | B2* | 5/2017 | Connell | B60R 11/00 |
| 10,427,612 | B2* | 10/2019 | Akdag Cakir | B60R 7/046 |
| 10,829,024 | B2* | 11/2020 | Qiu | B60N 3/104 |
| 10,843,633 | B2* | 11/2020 | Lynch | B60J 5/0468 |
| 11,110,858 | B2* | 9/2021 | Mihira | B60R 13/02 |
| 11,192,488 | B2* | 12/2021 | Takahashi | B60J 5/04 |
| 2016/0087485 | A1* | 3/2016 | Maeda | H02J 50/60 455/573 |
| 2016/0375834 | A1* | 12/2016 | Lemarchand | B60R 7/081 297/188.01 |
| 2022/0024379 | A1* | 1/2022 | Mihira | B60Q 3/217 |
| 2022/0080895 | A1* | 3/2022 | Salter | B60R 7/046 |

FOREIGN PATENT DOCUMENTS

| | | | | |
|---|---|---|---|---|
| DE | 202011110352 U1 | | 8/2013 | |
| JP | 2011084176 A | | 4/2011 | |
| KR | 1020150066139 A1 | * | 6/2015 | B60R 7/005 |

\* cited by examiner

VEHICLE DOOR POCKET

TECHNICAL FIELD

This disclosure relates generally to a vehicle door pocket comprising a removeable structure that can be configured in different ways to accommodate a plurality of powered devices.

BACKGROUND

A vehicle door includes a pocket that is used to store maps, umbrellas, water bottles, etc. As the popularity and variety of electronically powered user devices increases, vehicle operators have different feature expectations for their vehicle based on the types of powered devices that they use.

SUMMARY

An apparatus according to an exemplary aspect of the present disclosure includes, among other things, a vehicle door panel, a removeable structure having a retention member fixed on the vehicle door panel, and a holding element associated with the retention member to provide a pocket that can be configured in different ways to accommodate a plurality of powered devices. A power interface in the vehicle door panel powers at least one of the plurality of powered devices.

In a further non-limiting embodiment of the foregoing apparatus, there is a communications link between at least one of the plurality of powered devices and a vehicle touchscreen or control.

In a further non-limiting embodiment of any of the foregoing apparatus, a power source is connected to the power interface in the vehicle door panel to power the at least one of the plurality of powered devices when the vehicle is on.

In a further non-limiting embodiment of any of the foregoing apparatus, at least one battery is connected to the power interface in the vehicle door panel to power the at least one of the plurality of powered devices when the vehicle is off, and wherein the at least one battery is rechargeable by the power source via the power interface.

In a further non-limiting embodiment of any of the foregoing apparatus, the at least one of the plurality of powered devices comprises an air cleaner that sanitizes an interior compartment of a vehicle.

In a further non-limiting embodiment of any of the foregoing apparatus, the at least one of the plurality of powered devices comprises a sealed compartment to sanitize at least one object placed within the sealed compartment independent of sanitizing an interior compartment of a vehicle.

In a further non-limiting embodiment of any of the foregoing apparatus, the at least one of the plurality of powered devices comprises an auxiliary heater, and wherein the auxiliary heater can be configured to be selectively removable from the pocket.

In a further non-limiting embodiment of any of the foregoing apparatus, the at least one of the plurality of powered devices comprises a compartment that provides a heater/cooler that is powered by a Peltier device.

In a further non-limiting embodiment of any of the foregoing apparatus, the at least one of the plurality of powered devices comprises a removeable radar alarm.

In a further non-limiting embodiment of any of the foregoing apparatus, the at least one of the plurality of powered devices comprises an electronic lock box.

In a further non-limiting embodiment of any of the foregoing apparatus, the at least one of the plurality of powered devices comprises a charging device.

In a further non-limiting embodiment of any of the foregoing apparatus, the retention member comprises a retention ring strip, and wherein the pocket comprises a net, a flexible panel, or a rigid panel that is associated with the retention ring strip to provide a receptacle area between the pocket and the vehicle door panel.

In a further non-limiting embodiment of any of the foregoing apparatus, the pocket accommodates multiple powered devices from the plurality of powered devices, and wherein the multiple powered devices include at least a charging device, a sanitizer device, and a heater and/or cooler device.

In a further non-limiting embodiment of any of the foregoing apparatus, the retention ring strip extends at least partially about a perimeter of the pocket and wherein a plurality of fasteners secures the retention ring strip to the vehicle door panel.

In a further non-limiting embodiment of any of the foregoing apparatus, the pocket comprises the flexible or rigid panel, and wherein the retention ring strip is formed as one-piece with the flexible or rigid panel and is attached to the vehicle door panel with the plurality of fasteners.

In a further non-limiting embodiment of any of the foregoing apparatus, a vehicle power source is connected to the power interface in the vehicle door panel via a jumper harness to power the at least one of the plurality of powered devices when the vehicle is on, at least one battery is associated with the at least one of the plurality of powered devices, wherein the at least one battery powers the at least one of the plurality of powered devices when the vehicle is off, and wherein the at least one battery is connected to the power interface to be recharged by the vehicle power source, and a wireless communications link is between at least one of the plurality of powered devices and a vehicle touchscreen or control.

A method according to still another exemplary aspect of the present disclosure includes, among other things, mounting a removeable structure to a vehicle door panel to provide a pocket, wherein the removeable structure includes a holding element that can be configured in different ways to accommodate a plurality of powered devices; providing a power interface in the vehicle door panel to power at least one of the plurality of powered devices; and providing a communications link between at least one of the plurality of powered devices and a vehicle touchscreen or control.

In a further non-limiting embodiment of the foregoing method, the method includes connecting a vehicle power source to the power interface in the vehicle door panel via a jumper harness to power the at least one of the plurality of powered devices when the vehicle is on, and associating at least one battery with the at least one of the plurality of powered devices, wherein the at least one battery powers the at least one of the plurality of powered devices when the vehicle is off, and wherein the at least one battery is connected to the power interface to be recharged by the vehicle power source.

In a further non-limiting embodiment of any of the foregoing methods, the at least one of the plurality of powered devices comprises an air cleaner that sanitizes an interior compartment of a vehicle, a sealed compartment to sanitize at least one object placed within the sealed compartment independent of sanitizing an interior compartment of a vehicle, a selectively removable auxiliary heater, a compartment that comprises a heater or a cooler that is powered by a Peltier device, a removeable radar alarm, an electronic lock box, or a charging device for one or more of the plurality of powered devices.

In a further non-limiting embodiment of any of the foregoing methods, the at least one of the plurality of powered devices comprises at least three different powered devices.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details an exemplary vehicle door pocket providing a removeable structure that can be configured in different ways to accommodate a plurality of powered devices.

Figure 1:
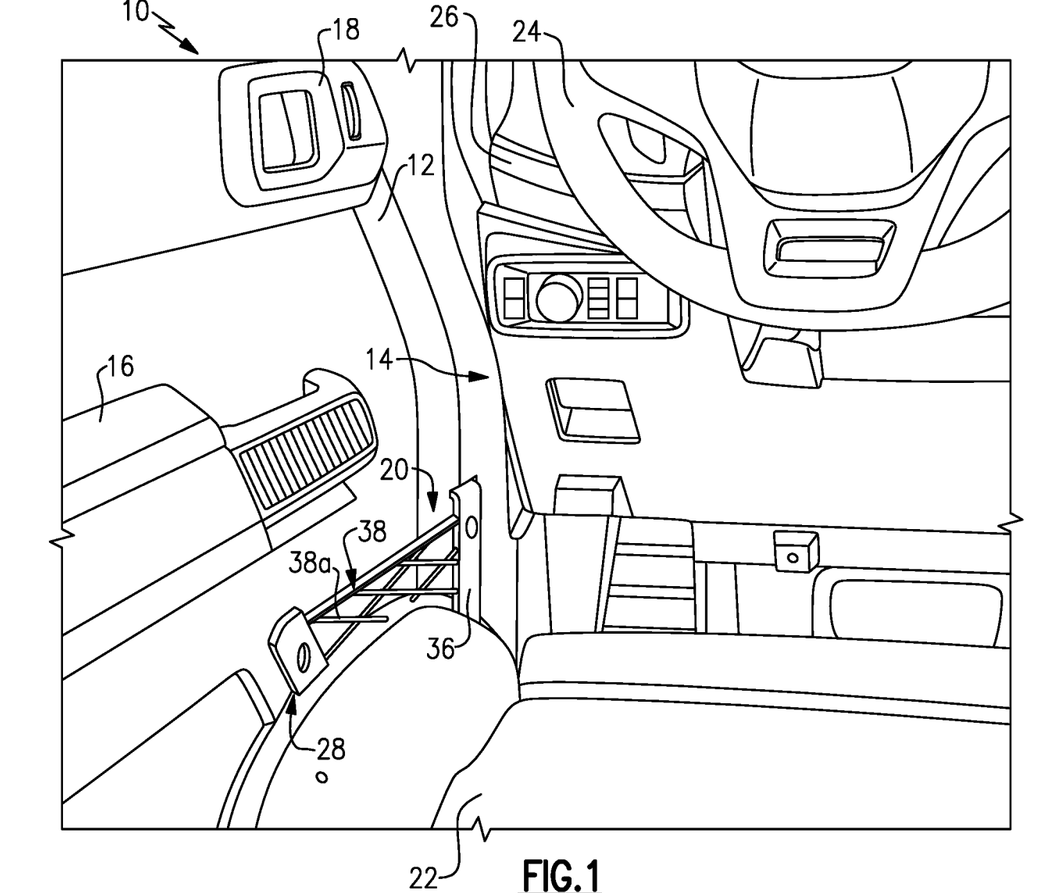
FIG. 1 is a perspective view of one example of a vehicle door incorporating a door pocket with a removable structure.

With reference to FIG. 1, a vehicle door 10 provides a vehicle door panel 12 that faces a passenger compartment 14. The vehicle door panel 12 comprises an inner trim panel that includes an arm rest 16, a door handle 18 above the arm rest 16, and a pocket area 20 below the arm rest 16. The pocket area 20 is adjacent to a bottom seat cushion 22 of a vehicle seat. On a driver's side of a vehicle, the bottom seat cushion 22 faces a steering wheel 24 and instrument panel 26.

Figure 2:
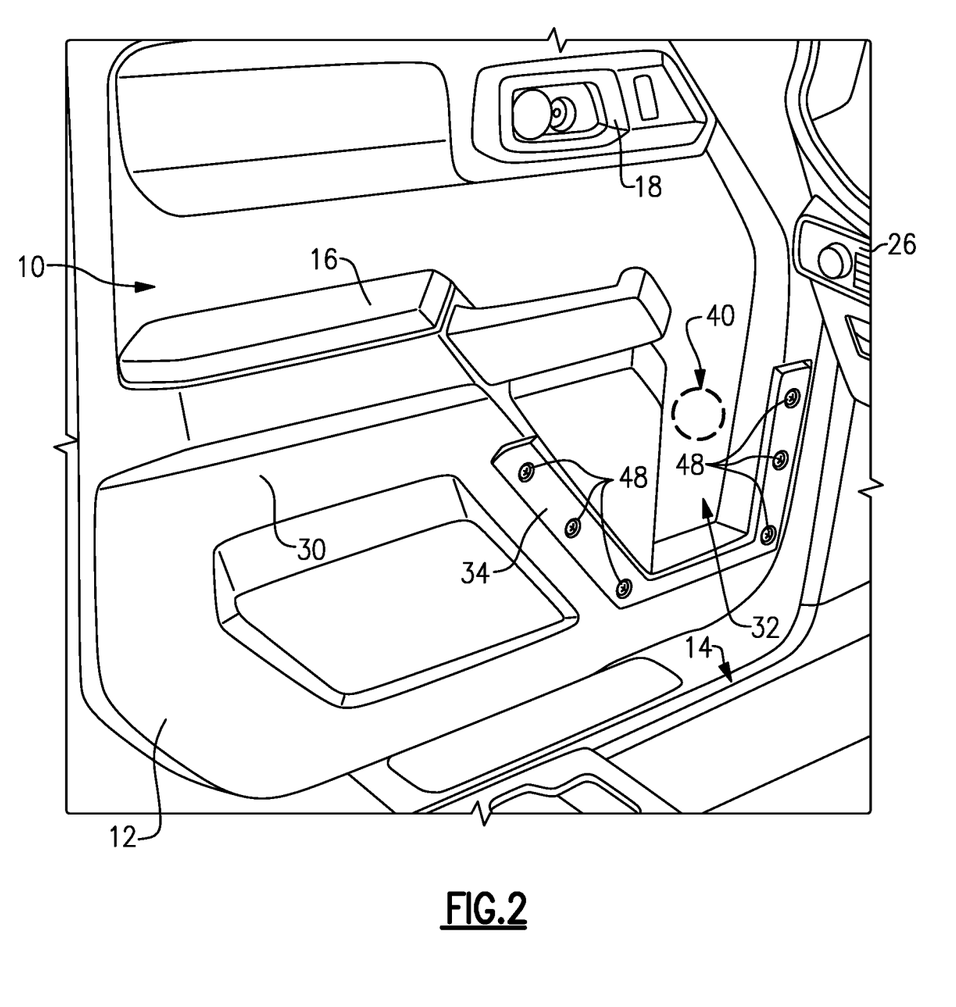
FIG. 2 shows a trim panel for the vehicle door of FIG. 1 but with the removable structure removed.

Located within the pocket area 20 of the vehicle door panel 12 is a removeable structure 28 that provides a pocket that can accommodate a plurality of powered devices. FIG. 2 shows that, in one example, the door panel 12 has an inwardly facing surface 30 and a recessed area 32 that extends in a direction away from the passenger compartment 14. The recessed area 32 corresponds to the pocket area 20. A boundary portion 34 extends at least partially around the perimeter of the recessed area 32. In one example, the boundary portion 34 provides for a mounting interface for the removable structure 28.

Figure 3:
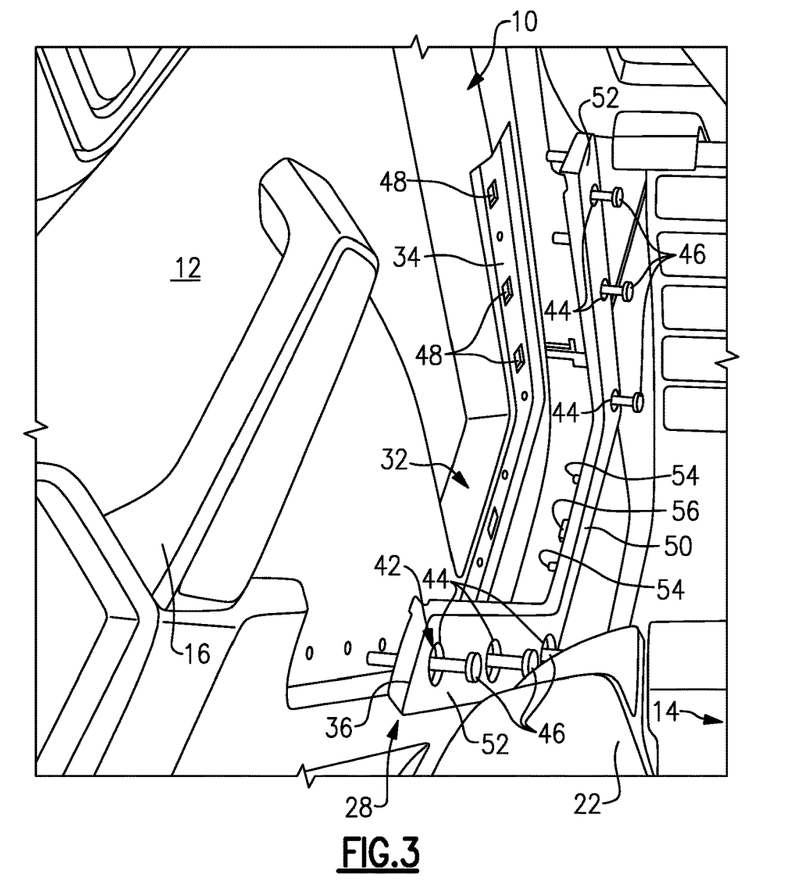
FIG. 3 shows the trim panel of FIG. 2 with the removable structure in a pre-assembly position.

In one example shown in FIG. 3, the removable structure 28 includes a retention member 36 that is fixed on the vehicle door panel 12. A holding element 38 (FIGS. 1 and 5) is associated with the retention member 36 to provide a pocket that can be configured in different ways to accommodate a plurality of powered devices. A power interface 40, shown schematically in FIG. 2, is provided in the vehicle door panel 12 to power the devices.

In one example, the retention member 36 comprises a retention ring strip that is mounted to the boundary portion 34. The retention ring strip comprises a relatively thin and flat body that extends at least partially about a perimeter of the pocket and does not overlap the recessed area 32. The retention ring strip includes a mount interface 42 (FIG. 3) that allows the strip to be removably attached to the door panel 12. In one example, the mount interface 42 comprises one or more fastener openings 44 that receive a plurality of fasteners 46. The fastener openings 44 align with corresponding openings 48 (FIG. 2) that are provided in the boundary portion 34.

Figure 4:
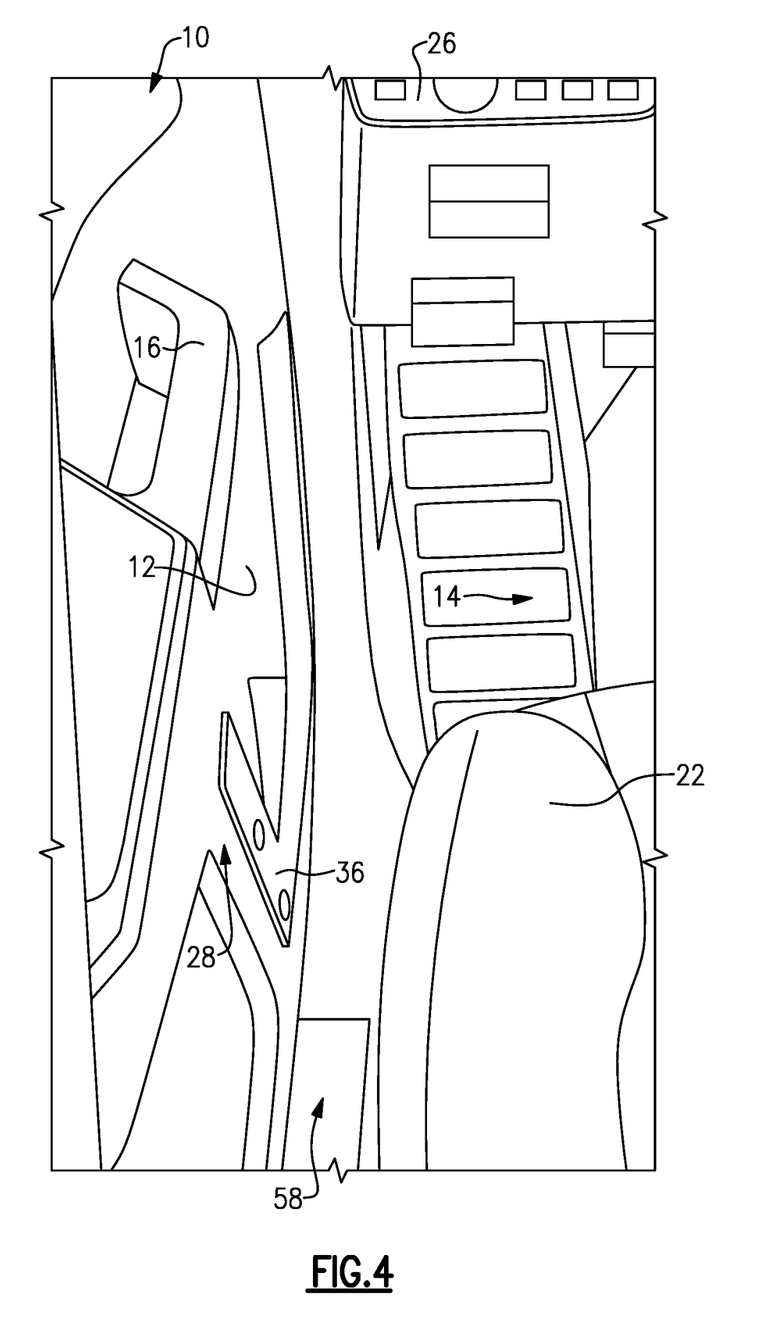
FIG. 4 shows a clearance area between a vehicle seat and the trim panel when the removable structure is installed.

In one example, the retention ring strip comprises a U-shape having a base portion 50 that connects a pair of leg portions 52. The fastener openings 44, for example, are located within the leg portions 52; however, openings could also be located within the base portion 50 if needed. Optionally, pins 54 and/or tabs 56 (FIG. 3) could be formed in the base portion 50 for locating purposes. In one example, at least six fasteners 46 are used (three per leg portion 52); however, fewer or additional fasteners could be utilized as needed. As shown in FIG. 4, once the retention ring strip is installed, the strip is generally flush with the inwardly facing surface 30 of the door panel 12 and leaves a clearance area 58 between the door panel 12 and the bottom seat cushion 22.

The retention ring strip can be used to removably secure different types of holding elements 38 to the door panel 12. FIG. 1 shows an example where the holding element 38 comprises a net 38a that forms a pocket between the door panel 12 and inner surface of the net 38a. In one example, the net 38a comprises a resilient element that can expand outwardly to accommodate objects, e.g. mobile devices, water bottles, umbrellas, etc., positioned within the pocket and can then return to a non-expanded position once the objects are removed.

Figure 5:
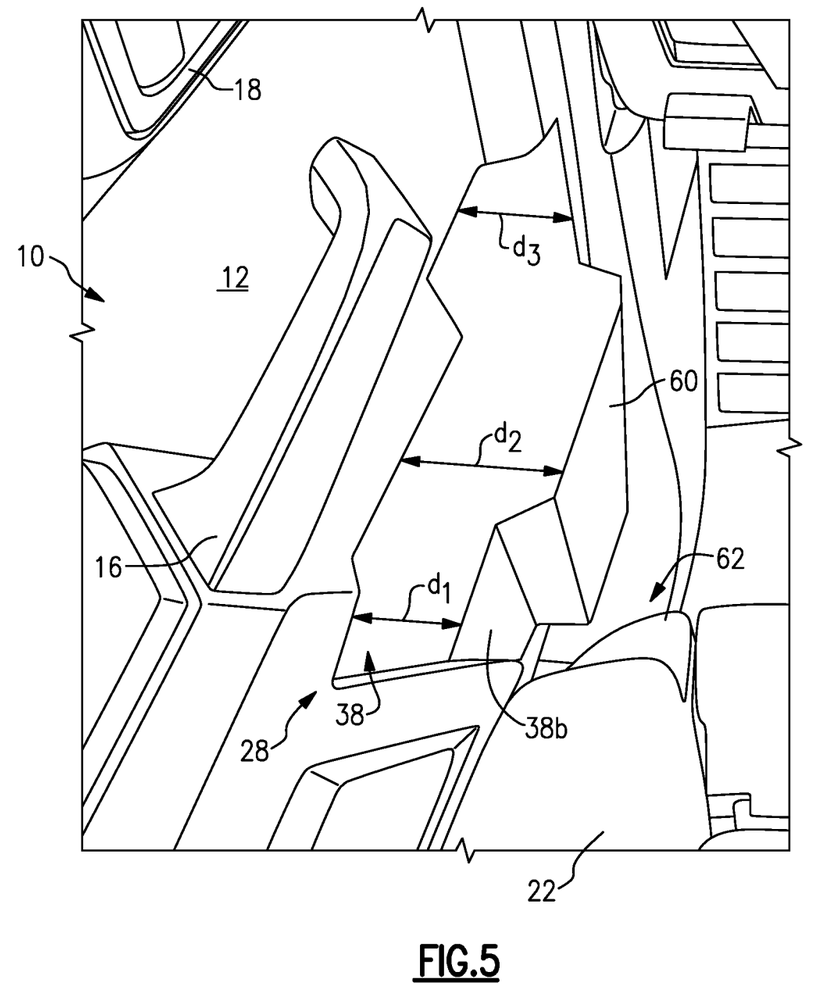
FIG. 5 shows another example of a removable structure.

FIG. 5 shows an example where the holding element 38 comprises a panel 38b that is associated with the retention ring strip to provide a receptacle or pocket area between an inner surface of the panel 38b and the vehicle door panel 12. The panel 38b can be made from a flexible or rigid material. The panel 38b can be separately attached to the retention ring strip, or the retention ring strip can be formed as one-piece with the flexible or rigid panel 38b, and the panel 38b is attached to the vehicle door panel 12 with the plurality of fasteners 46. In one example, the panel 38b has a contoured outer surface 60 is configured to provide desired clearance areas 62 for leg/foot room and between the seat cushion 22 and the door panel 12. This provides for a varying depth d1-d3 of the pocket that can accommodate various powered devices as well as other objects for storage.

The removable structure 28 allows for different holding elements 38 to be selected by the vehicle operator to accommodate the types of devices that they would like to utilize within the vehicle. Specifically, the pocket can be configured to accommodate a plurality of powered devices that are selected by the vehicle operator.

Figure 6:
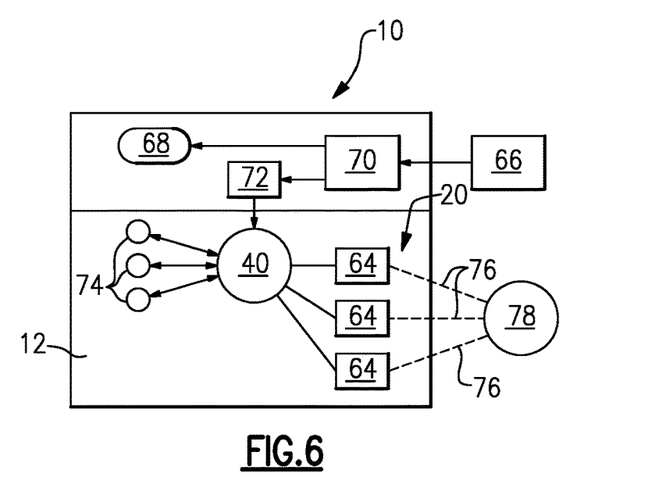
FIG. 6 is a schematic representation of a plurality of electrically powered devices located within the pocket area of the door.

FIG. 6 shows one example configuration where the door panel 12 includes a plurality of powered devices 64 that are within the pocket area 20 and are associated with the power connector/interface 40 located within the vehicle door 10. A vehicle power supply source 66, such as a vehicle battery for example, supplies power for door components 68 via a wiring harness 70. The door components 68 can comprise powered windows, locks, etc., for example. In one example, a jumper harness 72 is used to transfer power to the power interface 40 to provide power for the devices 64 while the vehicle is on. One or more dedicated batteries 74 can be used to provide power for the devices 64 while the vehicle is off. In one example, at least one battery 74 is associated with each device 64 and the batteries 74 power the devices 64 when the vehicle is off, and the batteries 74 are also recharged via connection with the interface 40 such that the devices can be powered when removed from the vehicle. For non-removable devices the batteries 74 can be mounted within the door 10 and can interface with the power interface 40 to power the devices. For removeable devices, the batteries 74 are mounted within the device 64 and are recharged via interfacing with the power interface 40. The devices 64 can also communicate via a communications link 76 to a vehicle touchscreen or control 78.

In one example, a wireless BlueTooth (BLE) communication link 76 is provided to the vehicle touchscreen or control 78. In another example, a hardwire local interface network (LIN) connection link 76 is provided to the vehicle touchscreen or control 78. The BLE and LIN are configured such that they can identify new devices 64 as they are added to the pocket. Additionally, any new devices/features that are added can upload associated features, controls, menus, etc. via the communications link 76.

In one example, running power is available for use and is provided in the door up to 30 A for door components 68. This power can be accessed via the small jumper harness 72. This power is used to power the devices 64 while the vehicle is running. When the vehicle is not running, the dedicated batteries 74 are used to power the devices as needed. In one example, lithium ion batteries are used; however, other types of batteries could also be used. Power from the vehicle can also be pulled to charge a feature/device battery 74 when certain predetermined conditions are met, and power can be pulled to start a vehicle engine to charge the feature/device battery 74.

Figures 7, 8, 9, 10, 11:
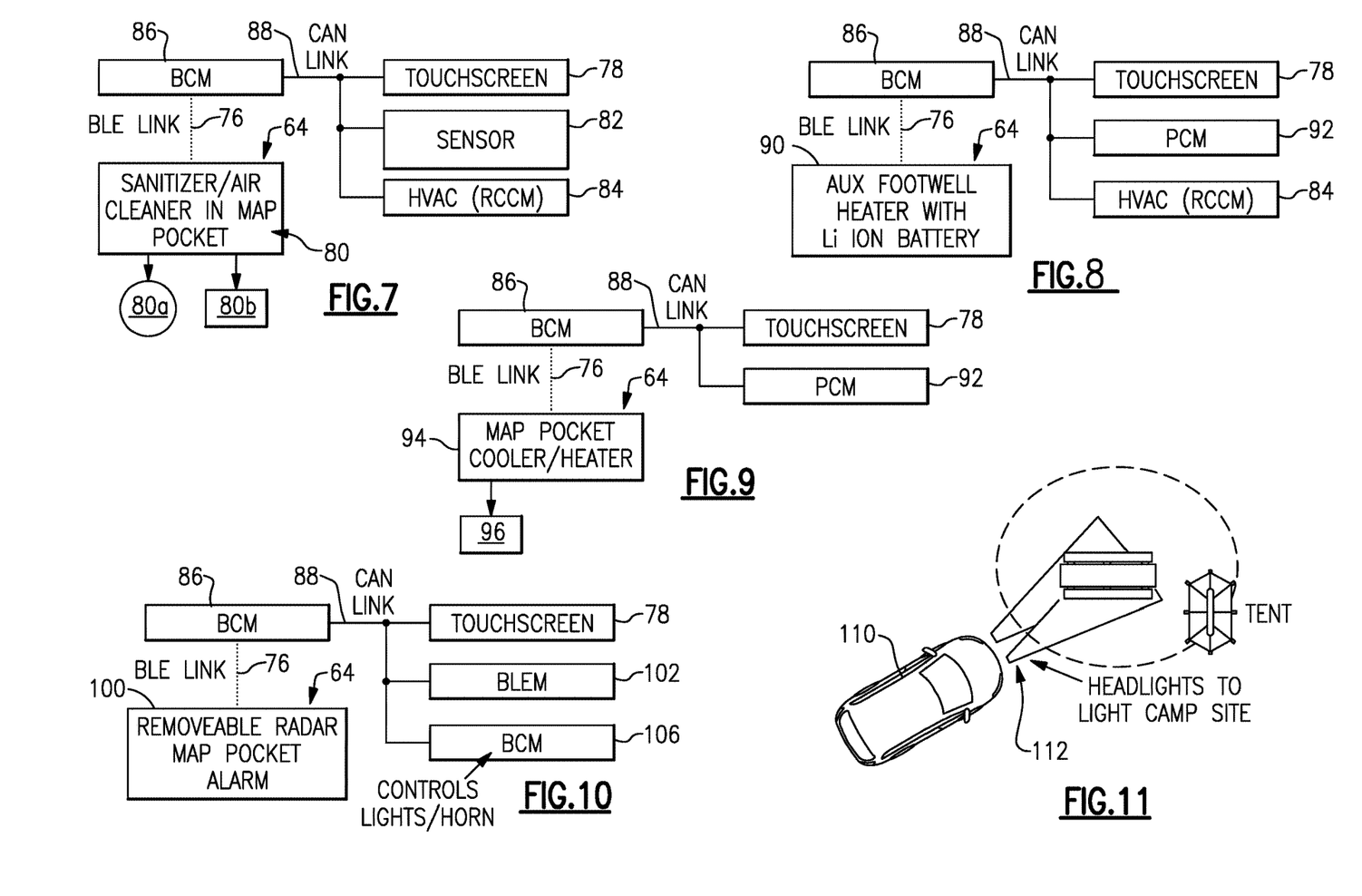
FIG. 7 is a schematic representation of a control diagram for one example of a powered device.
FIG. 8 is a schematic representation of a control diagram for another example of a powered device.
FIG. 9 is a schematic representation of a control diagram for another example of a powered device.
FIG. 10 is a schematic representation of a control diagram for another example of a powered device.
FIG. 11 is a schematic representation of an application for the powered device of FIG. 10.

In one example shown in FIG. 7, the powered device 64 comprises an air cleaner 80 that sanitizes the interior passenger compartment 14 of the vehicle. In one example, the air cleaner 80 comprises an unattended vehicle ozone generator or comprises an electro-static air cleaner while the vehicle is occupied. In one example, the ozone generator is a small battery powered ozone generator that is associated with the pocket. An example of such a generator is that of CleanZone™. When using the ozone generator, existing circuit monitoring system (CMS) sensors and/or occupant classification system (OCS) sensors 82 can be used to verify that the vehicle is unoccupied. Sanitization can be requested through the touchscreen/control 78 or can be automatically done after verification that the vehicle is unoccupied. Once the request and/or verification is made, the doors are locked so that there is no entry into the vehicle during the sanitization process. The air cleaner 80 can use a duct 80a within the door 10, for example, to introduce sanitizer into the passenger compartment 14. The heating, ventilation, and air conditioning (HVAC) 84 can be used to flush interior air out if immediate entry is desired during, or just after, the process and before unlocking doors. Otherwise after a certain time, e.g. 30 minutes for example, the ozone disappears naturally. Sanitization can also take place if occupied using the electro-static air cleaner in combination with the HVAC.

In another example, the powered device comprises a sealed compartment 80b that is used to sanitize at least one object placed within the sealed compartment 80b. This can be done interpedently and without sanitizing the interior passenger compartment 14 of the vehicle. The sealed compartment 80b is located within the pocket as a separate container engaged to the power interface 40, or can be incorporated within the door itself. This type of compartment 80b is useful for sanitizing small items such as a mobile device or baby toy while being an inductive charger.

In each of these examples, the cleaner 80 communicates with a body control module (BCM) 86 via the communication link 76. The BCM 86 then communicates with the touchscreen/control 78, sensors 82, and a remote climate control module (RCCM) of the HVAC 84 via a controlled area network (CAN) link 88.

In another example, the powered device comprises an auxiliary heater 90 as shown in FIG. 8. The auxiliary heater 90 communicates with the BCM 86 via the communication link 76. The BCM 86 then communicates with the touchscreen/control 78, a powertrain control module (PCM) 92, and the RCCM of the HVAC 84 via the CAN link 88. In one example, the auxiliary heater 90 comprises an instant start auxiliary heater 90 that is useful in cold climates as it can be powered to immediately provide hot air heat on occupants' feet long before the HVAC 84 warms up. In another example, the auxiliary heater 90 is used with "Idle Mitigation" features to provide heat when engine block heat has gone cold. This allows more heating in the passenger compartment 14 when the vehicle is idling and is being used as a mobile office. In another example, the auxiliary heater 90 comprises a selectively removable auxiliary heater. The auxiliary heater 90 can be unlatched to become a small portable heater for use outside of the vehicle for tailgating or camping.

The auxiliary heater 90 is powered by the feature/device battery 74. The purpose of the battery 74 is to allow the heater 90 to work without impacting a vehicle charge margin. This is important because in a cold vehicle with HVAC on high, seat heaters, rear defroster, heated steering wheel, etc. there is not a lot left over to maintain positive charge margin. The PCM 92 controls the alternator and identifies when enough current is being generated (charge margin) so that the feature battery 74 in the heater 90 can be recharged. The auxiliary heater 90 only charges when the PCM 92 has enough spare current to charge.

The various features of the auxiliary heater 90 can be programmable through the touch screen/control 78. One example feature is an Activate Temperature and Turn-Off Temperature Feature, which only activates if an interior temperature is below an activate point and then turns off when the turn-off temperature is reached, e.g. when the vehicle warms, or the auxiliary heater battery 74 reaches a low state of charge. Another example feature includes the option to increase pocket heater battery life by limiting the depth of discharge on battery, such as by turning off the heater 90 before the battery 74 goes below a fixed point of charge. The auxiliary heater 90 uses the interior temperature as determined by the HVAC system with manual control of the auxiliary heater 90 through the touchscreen/control 78. When the auxiliary heater 90 is removed from the vehicle, control is via the BLE link to a mobile device, for example.

In another example, the powered device comprises a compartment that provides a heater or a cooler unit 94 that is powered by a Peltier device 96 as shown in FIG. 9. As known, the Peltier device 96 can either heat or cool objects within the compartment depending on a selected setting. The heater or cooler unit 94 communicates with the BCM 86 via the communication link 76. The BCM 86 then communicates with the touchscreen/control 78 and the PCM 92 via the CAN link 88. When the unit 94 is not connected to vehicle operating power, the feature battery 74 will be used to continue to power the unit 94. The heater or cooler unit 94 can run off of the vehicle power when the vehicle is running. The feature battery 74 is only charged when there is excess charge margin. The temperature of the heater or cooler unit 94 can be programmed through the touch screen/control 78 while in the vehicle and connected to power, and via a mobile device when being powered by the feature battery 74. The system can be configured such that reminders and/or icons will pop up on the touchscreen/control 78 to remind the occupants that the heater or cooler unit 94 is in operation and/or to remind that there is something left in the unit 94 when the vehicle is shut off or started.

In another example, the powered device comprises a removeable radar alarm unit 100. The removeable radar alarm 100 communicates with the BCM 86 via the communication link 76. The BCM 86 then communicates with the touchscreen/control 78, a Bluetooth Low Energy module (BLEM) 102, and a BCM 106 for the horn/vehicle lights 112 via the CAN link 88. Small economical radars on a chip are available from companies such as Infineon or Texas Instruments. The chip is incorporated into a removable alarm unit 100 that is powered by the feature battery 74 and charges from a vehicle 110 when plugged into the pocket. The alarm unit 100 is BLE linked to the vehicle 110 so that it can utilize the horn/vehicle lights 112 for an alarm. At night when alarm is activated, lights 112 turn on to illuminate an area 108 (FIG. 11), such as a campsite for example, and the horn honks. The unit can use a Blue Tooth Low Energy Antenna Module (BLEAM) in the vehicle to triangulate and determine if the authorized users or mobile device is within a programmable distance up to a predetermined range, such as 600 ft for example, but outside the radar protection zone before setting off the alarm or having the vehicle send a BLE message to the user. The unit 100 can also be programmed to avoid trigging the alarm if the owner's mobile device is within the alarm zone.

Other examples of powered devices 64 (FIG. 6) that can be included in the pocket in addition to any or all of the above, and in any combination, includes an electronic lock box, a charging device for one or more of the plurality of powered devices 64, a life pack holder/charger unit for first responders, devices associated with an emergency/first aid kit, speakers, rechargeable flash light with a cradle, deployable work surface with illumination, etc.

Each of the devices can also be configured such that the device and/or compartment unlocks or becomes useable only when a key fob or associated mobile device is within a predetermined distance. The vehicle operator can selectively configure the pocket to accommodate one or more of the devices to meet the needs of the operator. For example, an operator can request a configuration that includes a charging device, a sanitizer device, and a heater and/or cooler device. The pocket can be configured such that additional components can also be added over time. Additional components can include mobile devices such as phones, watches, pads, tablets, etc., for example. Also, if additional devices are to be included, the netting or panel can be removed to accommodate different sizes and/or device configurations. The new features to be added to vehicle will fully integrate using existing vehicle features (touch screen, horn, lights, adjusting charge margin and time, coordinate HVAC, etc.)

Figure 12:
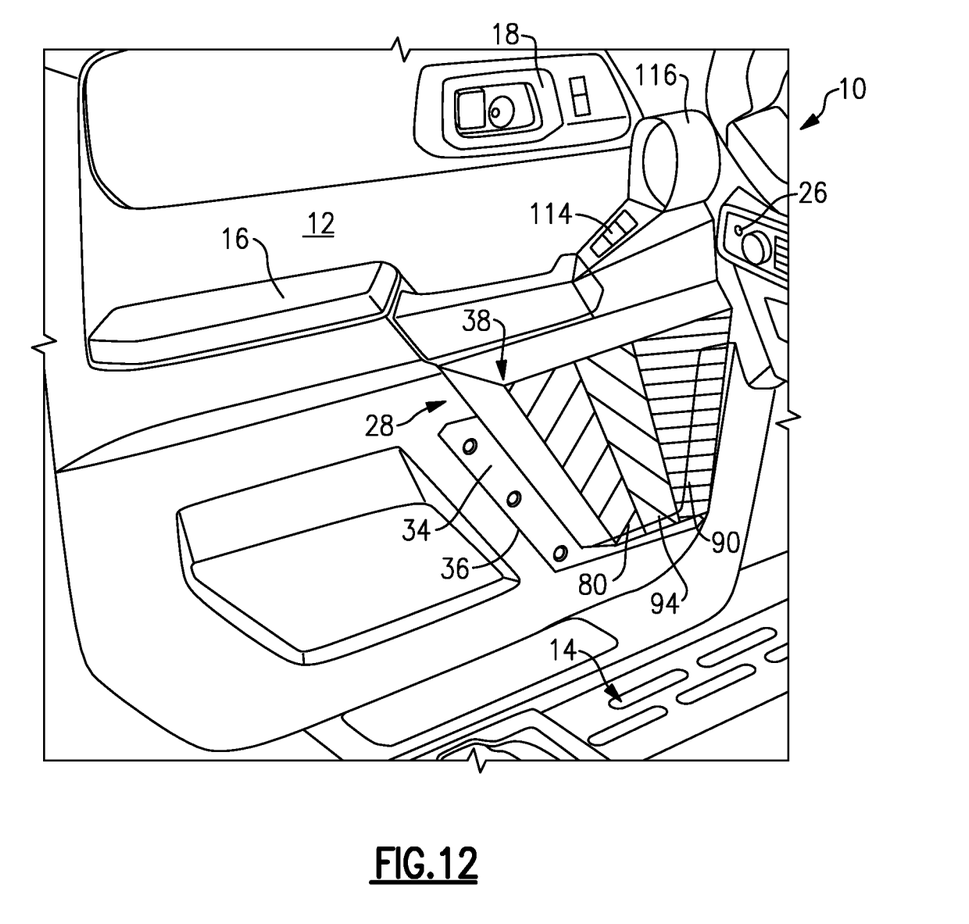
FIG. 12 shows an example configuration for a plurality of powered devices.

FIG. 12 shows an example configuration that can incorporate features such as the air cleaner 80, the auxiliary heater 90, and the heater/cooler unit 94. The power interface 40 is provided under the trim panel 12 and an optional control pad 114 can be provided near the armrest 16. An upper air duct 116 for the cleaner unit 80 can also be provided in the door 10.

Figure 13:
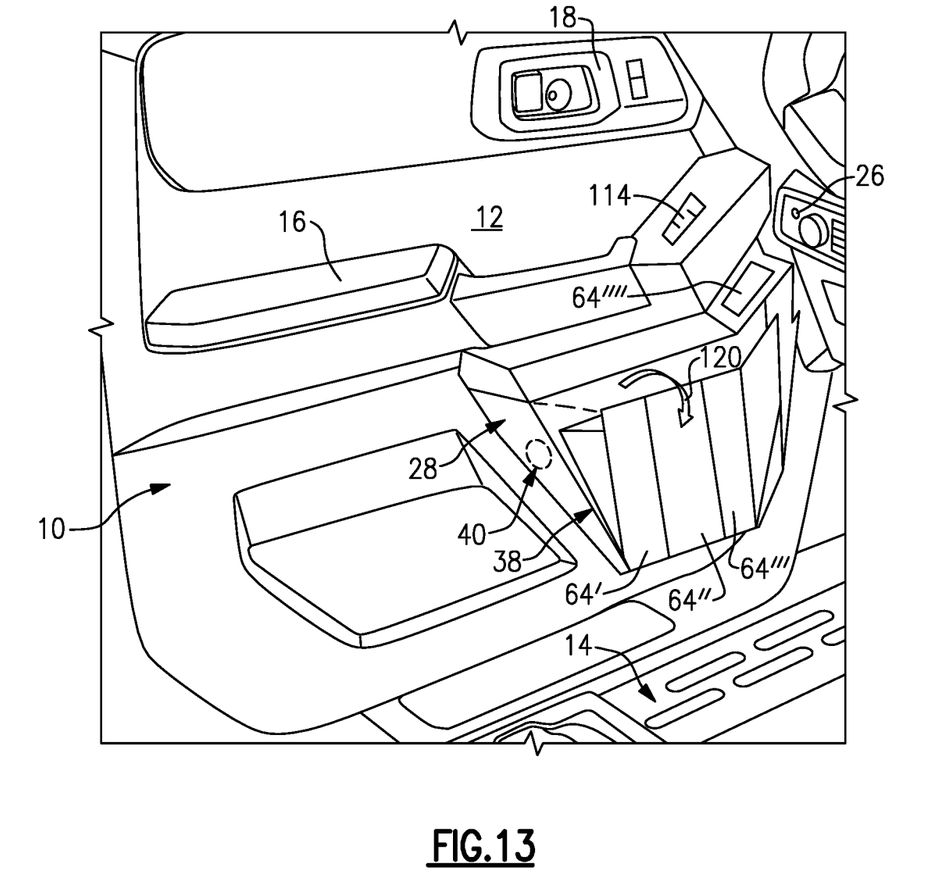
FIG. 13 shows another example configuration for a plurality of powered devices.

FIG. 13 shows an example configuration that can incorporate various features within the pocket such as the removable radar unit 100, or other powered devices 64 such as an electronic lock box, a charging device, a life pack holder/charger unit for first responders, devices associated with an emergency/first aid kit, speakers, rechargeable flash light with a cradle, deployable work surface with illumination, etc. In this example, a panel 38b can be pivotable, as indicated by arrow 120, between open and closed positions. This can provide a lock box 64', cooler/heater 64", charging device 64''', etc. feature that can cooperate with the power interface 40. Other features such as a rechargeable flashlight 64'''' could be mounted along other portions of the removable structure 28. The optional control pad 114 can also be provided near the armrest 16 to interact with any of the devices 64.

Figure 14:
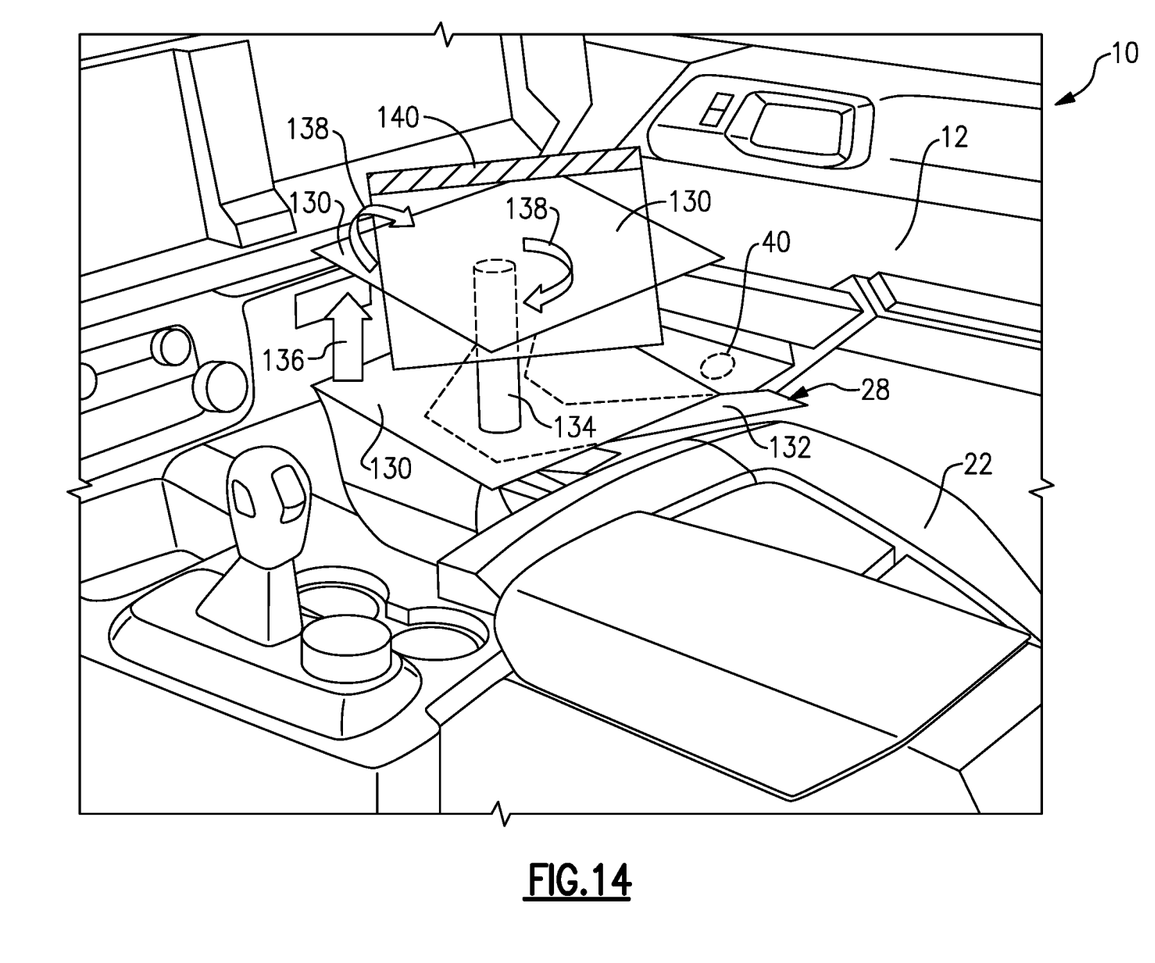
FIG. 14 shows an example configuration for a work surface.

FIG. 14 shows another example where a deployable work surface 130 is incorporated into the removeable structure 28. The work surface 130 is in an upright position against the trim panel 12 when not in use and can be pivoted at least 90 degrees away from the trim panel 12 when in use. The work surface 130 is associated with a support 132 and a lift or stand 134 can be used to raise the work surface 130 as indicated at 136. The work surface 130 can also be tilted/adjusted as indicated at 138. The work surface 130 may also be provided with illumination 140 via the power interface 40.

FIGS. 12-14 are examples of different door pocket configurations that can be provided by the removable structure 28. The dock pocket can be customized for a vehicle operator for any combination of devices 64 is desired by a user when the vehicle is purchased. The pocket can also be configured to add one or more additional devices after purchase, or the pocket can be removed and replaced with a different pocket configuration after purchase to accommodate different combinations of devices 64.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
a vehicle door panel comprising an inner trim panel that includes an inwardly facing surface with a recessed pocket area and a recessed boundary portion that extends at least partially around a perimeter of the recessed pocket area;
a removeable structure having a retention member fixed within the recessed boundary portion on the inwardly facing surface of the inner trim panel such that the retention member is flush with the inwardly facing surface of the inner trim panel;
a holding element associated with the retention member to provide a pocket directly between the inwardly facing surface of the inner trim panel and the holding element at the recessed pocket area, and wherein the holding element can be configured in different ways to accommodate a plurality of powered devices; and
a power interface in the vehicle door panel to power at least one of the plurality of powered devices.

2. The apparatus of claim 1, wherein at least one powered device of the plurality of powered devices is held within the pocket, and including a communications link between the at least one powered device and a vehicle touchscreen or control.

3. The apparatus of claim 2, including a power source that is connected to the power interface in the vehicle door panel to power the at least one powered device when the vehicle is on.

4. The apparatus of claim 3, including at least one battery that is connected to the power interface in the vehicle door panel to power the at least one powered device when the vehicle is off, and wherein the at least one battery is rechargeable by the power source via the power interface.

5. The apparatus of claim 4, wherein the at least one powered device comprises an air cleaner that sanitizes an interior compartment of a vehicle.

6. The apparatus of claim 4, wherein the at least one powered device comprises a sealed compartment to sanitize at least one object placed within the sealed compartment independent of sanitizing an interior compartment of a vehicle.

7. The apparatus of claim 4, wherein the at least one powered device comprises an auxiliary heater, and wherein the auxiliary heater can be configured to be selectively removable from the pocket.

8. The apparatus of claim 4, wherein the at least one powered device comprises a compartment that provides a heater/cooler that is powered by a Peltier device.

9. The apparatus of claim 4, wherein the at least one powered device comprises a removeable radar alarm.

10. The apparatus of claim 4, wherein the at least one powered device comprises an electronic lock box.

11. The apparatus of claim 4, wherein the at least one powered device comprises a charging device.

12. The apparatus of claim 1, wherein the retention member comprises a retention ring strip, and wherein the pocket comprises a net, a flexible panel, or a rigid panel that is associated with the retention ring strip to provide a receptacle area between the pocket and the vehicle door panel.

13. The apparatus of claim 12, wherein multiple powered devices from the plurality of powered devices are accommodated within the pocket, and wherein the multiple powered devices include at least a charging device, a sanitizer device, and a heater and/or cooler device.

14. The apparatus of claim 12, wherein the retention ring strip comprises a U-shaped strip having a base portion that connects a pair of leg portions, and wherein the recessed boundary portion comprises a U-shaped recess that extends at least partially about the perimeter of the recessed pocket area, and wherein the U-shaped strip fits within the U-shaped recess with a plurality of fasteners securing the U-shaped strip directly to the inwardly facing surface of the vehicle door panel.

15. The apparatus of claim 14, wherein the pocket comprises the flexible or rigid panel, and wherein the retention ring strip is formed as one-piece with the flexible or rigid panel and is attached to the vehicle door panel with the plurality of fasteners.

16. The apparatus of claim 12, wherein the plurality of powered devices comprises at least three different powered devices held within the pocket, and including
a vehicle power source that is connected to the power interface, which comprises a common power interface in the vehicle door panel at the recessed pocket area, via a jumper harness to power the plurality of powered devices when the vehicle is on,
at least one battery associated with the plurality of powered devices, wherein the at least one battery powers the plurality of powered devices when the vehicle is off, and wherein the at least one battery is connected to the power interface to be recharged by the vehicle power source, and
a wireless communications link between the plurality of powered devices and a vehicle touchscreen or control.

17. A method comprising:
providing a vehicle door panel comprising an inner trim panel that includes an inwardly facing surface with a recessed pocket area and a recessed boundary portion that extends at least partially around a perimeter of the recessed pocket area
mounting a removeable structure to the inner trim panel to provide a pocket at the recessed pocket area, wherein the removeable structure includes a retention member and a holding element;
fixing the retention member within the recessed boundary portion on the inwardly facing surface of the inner trim panel such that the retention member is flush with the inwardly facing surface of the inner trim panel;
forming the pocket directly between the inwardly facing surface of the inner trim panel and the holding element at the recessed pocket area, and wherein the holding element can be configured in different ways to accommodate a plurality of powered devices;
providing a power interface in the vehicle door panel to power at least one powered device of the plurality of powered devices; and
providing a communications link between the at least one powered device and a vehicle touchscreen or control.

18. The method of claim 17, including connecting a vehicle power source to the power interface in the vehicle door panel via a jumper harness to power the at least one powered device when the vehicle is on, and associating at least one battery with the at least one powered device, wherein the at least one battery powers the at least one powered device when the vehicle is off, and wherein the at least one battery is connected to the power interface to be recharged by the vehicle power source.

19. The method of claim 18, wherein the at least one powered device comprises an air cleaner that sanitizes an interior compartment of a vehicle, a sealed compartment to sanitize at least one object placed within the sealed compartment independent of sanitizing an interior compartment of a vehicle, a selectively removable auxiliary heater, a compartment that comprises a heater or a cooler that is powered by a Peltier device, a removeable radar alarm, an electronic lock box, or a charging device for one or more of the plurality of powered devices.

20. The method of claim 17, wherein the at least one powered device comprises at least three different powered devices.

21. The method of claim 17, including providing the holding element as a rigid panel that provides at least three different varying depths between the rigid panel and the inwardly facing surface of the inner trim panel.

22. The method of claim 17, wherein the at least one powered device comprises an air cleaner that sanitizes an interior compartment of a vehicle and/or a sealed compartment to sanitize at least one object placed within the sealed compartment independent of sanitizing the interior compartment of a vehicle.

23. The method of claim 17, wherein the at least one powered device comprises a compartment that provides a heater/cooler that is powered by a Peltier device.

24. The method of claim 17, wherein the at least one powered device comprises an electronic lock box and/or a removeable radar alarm.

25. The method of claim 17, wherein the at least one powered device comprises a plurality of powered devices, and including powering the plurality of powered devices with a common power interface in the vehicle door panel at the recessed pocket area.

* * * * *